Aug. 19, 1947. S. S. KNOX 2,425,886
LAUNCHING AND LANDING OF LAND-BASED AIRPLANES
Filed Feb. 26, 1945 3 Sheets-Sheet 1
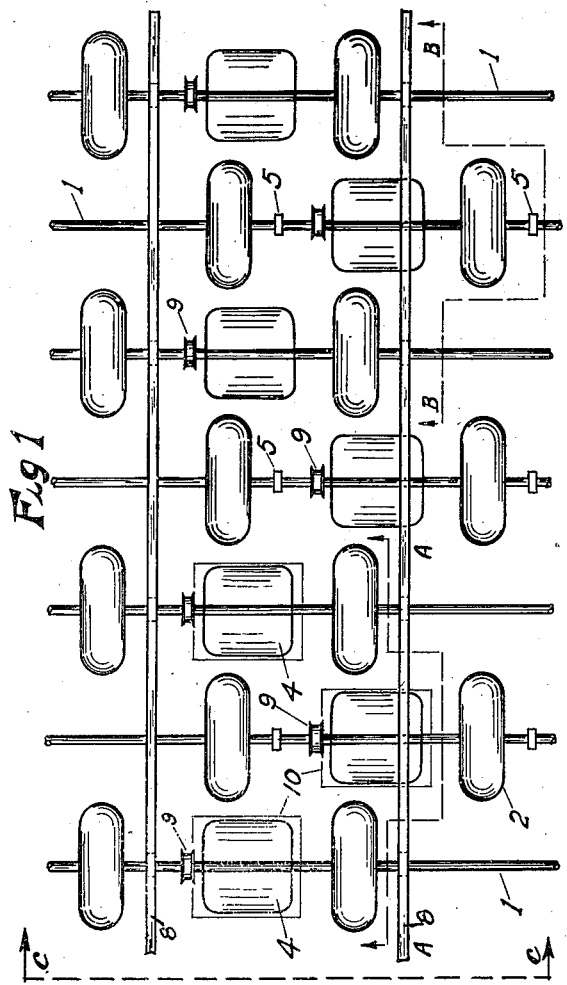
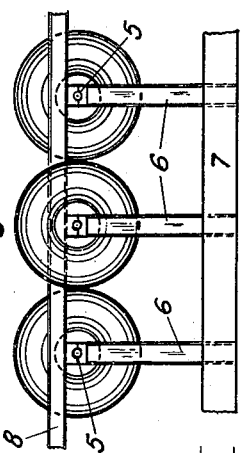
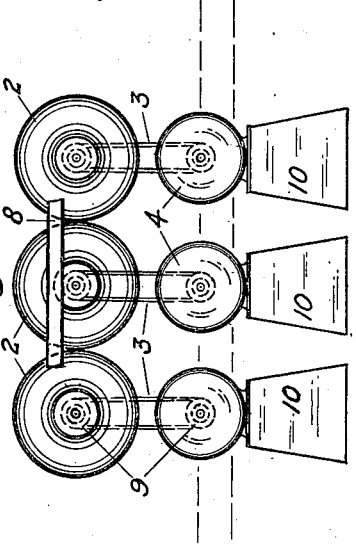
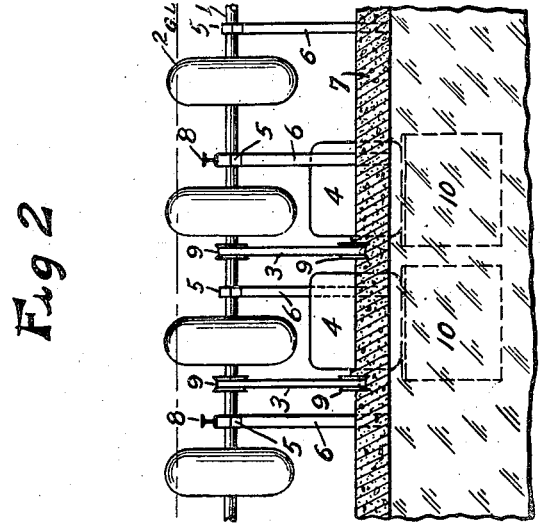
INVENTOR
SAMUEL S. KNOX
*Samuel S. Knox*

Aug. 19, 1947.   S. S. KNOX   2,425,886
LAUNCHING AND LANDING OF LAND-BASED AIRPLANES
Filed Feb. 26, 1945   3 Sheets-Sheet 2
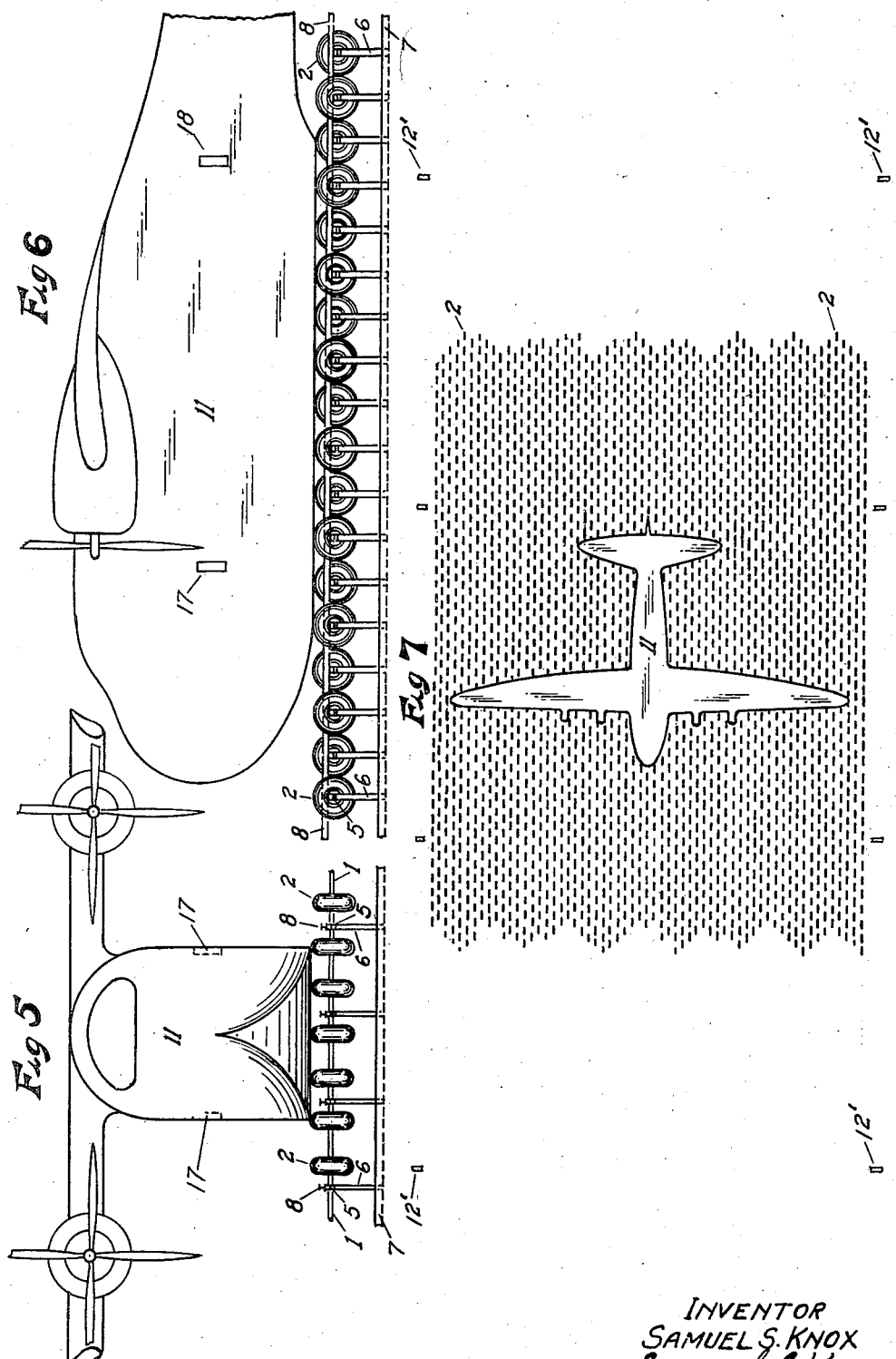
INVENTOR
SAMUEL S. KNOX
Samuel S. Knox Aug. 19, 1947.  S. S. KNOX  2,425,886
LAUNCHING AND LANDING OF LAND-BASED AIRPLANES
Filed Feb. 26, 1945  3 Sheets-Sheet 3
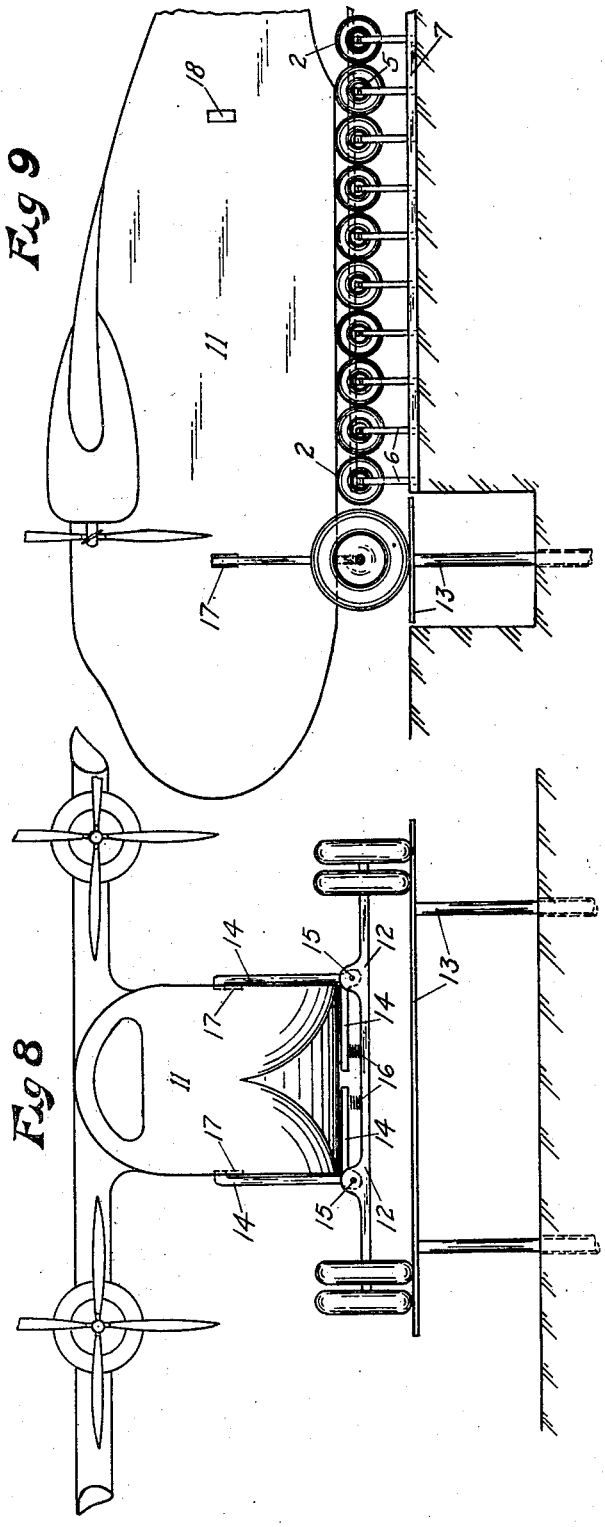
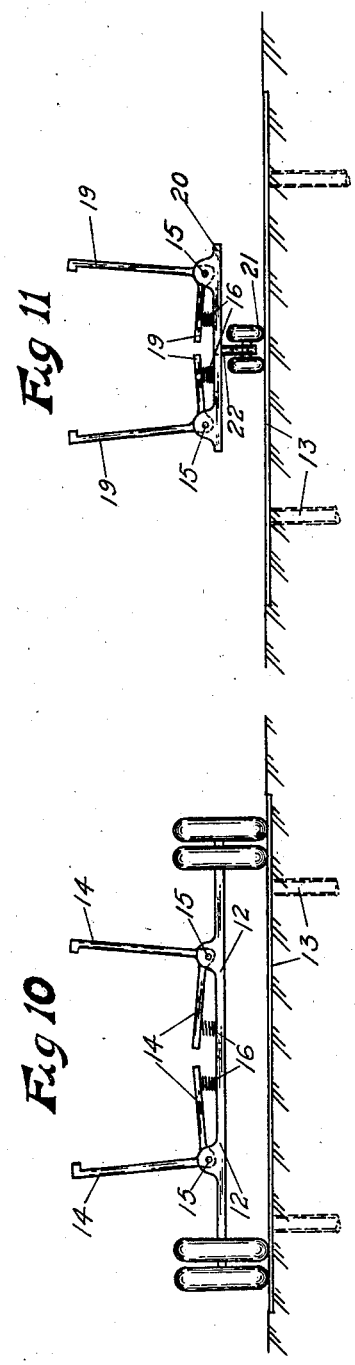
INVENTOR
SAMUEL S. KNOX
Samuel S. Knox Patented Aug. 19, 1947

2,425,886

UNITED STATES PATENT OFFICE 2,425,886

LAUNCHING AND LANDING OF LAND-BASED AIRPLANES

Samuel S. Knox, Long Beach, Calif.

Application February 26, 1945, Serial No. 579,777

4 Claims. (Cl. 244—114)

This invention is specifically concerned with a mechanized landing strip or "take-off" runway from which aeroplanes may be launched into the air and landed on the ground without the use of attached landing wheels or any of their attached "landing gear" accessories, and with a means by which an aircraft may be moved from place to place on the ground.

It is the object of the invention to provide a practical method of accomplishing this and by so doing eliminate the weight of these parts from the gross weight of the aircraft. This will of course increase the "useful load" carried by the aircraft by an equal amount which will be a great improvement over the present designs of passenger and freight aeroplanes.

Another object of my invention is to substantially shorten the length of the "take-off run" and the length of the run required to bring the aeroplane to a stop after landing.

Another purpose of my invention is to provide a means by which an aircraft may be moved from place to place while on the ground of an air field, either by its own power or by being towed by the small tractors usually provided for this purpose.

Another purpose of my invention is to provide a means by which an aeroplane may be either removed from or returned to the mechanized landing strip when it is desirable to move the aeroplane from place to place on the ground of the landing field.

Another purpose of my invention is to provide a means of moving an aeroplane to any desired position along the length of the landing strip, either in a forward or backward direction, by use of the landing strip mechanism.

Another purpose of my invention is to provide a means by which an aeroplane may be launched into the air from detachable carriages or trucks without the use of attached wheels or other attached landing gear of any kind.

The various objects and features of my invention will be more fully understood from the following detailed description of a typical preferred form and application of the invention, throughout which descriptive reference is made to the accompanying drawings in which:

Fig. 1 is a plan view of a section of the landing strip showing the general arrangement of the various parts of the mechanism. Fig. 2 is an end elevation of Fig. 1 taken from the line C—C. Fig. 3 is a side elevation of Fig. 1 taken on the line A—A. Fig. 4 is another side elevation of Fig. 1 taken on the line B—B. Fig. 5 is a front elevation of a typical large aeroplane at rest on a section of the landing strip mechanism. Fig. 6 is a side elevation of Fig. 5. Fig. 7 shows how an aeroplane would appear when at rest on a section of the landing strip when viewed from directly above, at a considerable height. Fig. 7 also shows a series of photo-electric beam projectors and receivers which are placed along the runway at equal distances from each other. They must be spaced apart a distance greater than the length of the largest aircraft that will have occasion to use the landing strip. Fig. 8 shows a front elevation of a typical large aeroplane with a two-wheeled carriage or "truck" in position for taking the weight of the aeroplane. Fig. 8 also shows an elevator which lifts the truck into position and lifts the front end of the aeroplane free of the landing strip. Fig. 9 shows a side elevation of Fig. 8. Fig. 10 is a detail showing a front elevation of the two-wheeled carriage or truck used to carry the front end of the aeroplane when it is moved on the ground. Fig. 11 shows a front elevation of a two-wheeled carriage or truck used to carry the rear end of the aeroplane while being moved on the ground.

In accordance with the invention, the landing strip is provided with a large number of small pneumatic-tired wheels. These wheels may be rotated at any desired speed, either clockwise or counter-clockwise. The wheels are spaced so that a sufficient number will always be in contact with the bottom of the aircraft to insure its stability while on the landing strip.

The aeroplane using the mechanized landing strip will necessarily be of the high-wing type in order to give sufficient clearance for the propellers. The fuselage will be flat-bottomed for a length sufficient to give longitudinal stability while on the landing strip.

On the "take-off run" additional power will be added to the aircraft beyond the power of its own motors through the wheels of the landing strip which are motor-driven. This will materially shorten the length of the run before the aeroplane is airborne.

In landing, the wheels of the landing strip will be rotated to a speed such that the circumferential speed of the tires is slightly less than the landing speed of the aeroplane. As soon as contact is made by the bottom of the fuselage with the runway wheels, the power rotating the runway wheels will be turned off and the aeroplane will be automatically stopped by the slowing down of the runway mechanism. If desired, the motors may be reversed and the aeroplane brought to a quick stop. There will probably be 25 wheels in contact with the bottom of the aeroplane at all times and the braking or slowing effect of these wheels will be much higher than it is with the present type of aeroplane, where there are only two wheels to which the brakes may be applied.

The power which can be supplied the aeroplane on the take-off run will be limited only by the horsepower each wheel can transmit to the bottom of the fuselage without slipping. Supposing 25 wheels to be in contact with the aeroplane at all times during the take-off run, and that each wheel can transmit 50 H. P. to the aeroplane during the time it is in contact with the bottom of the fuselage. We would then be able to supply 1250 H. P. to the aeroplane during the take-off run.

Carrying this idea further, we will assume that each shaft that carries the pneumatic-tired wheels is driven by a 50 H. P. motor. It will then be necessary to divide the landing strip into groups of 25 driving shafts, driven by 25 motors; then each shaft in a group of 25 shafts will be connected by belts or gears to each of the other 24 members of this particular group, thereby furnishing a total of 1250 H. P. which will be available at all times while the aeroplane is passing over this particular group of power units.

In the drawings I have shown each motor driving a single shaft. In practice, it will probably be more economical and practical to have each motor drive three or more wheel shafts.

Also, in the drawing I have shown the driving shafts on which the small pneumatic-tired wheels are mounted as supporting a large and heavy aeroplane which would have a comparatively low landing speed and the pneumatic cushion furnished by the tires would be very desirable. However, for small fast aircraft such as jet-propelled fighters and fast medium bombers whose fuselages are comparatively small, we could use small short cylinders mounted on alternate shafts similar to the spacing of the wheels as shown in Fig. 1. Another alternative would be to use long cylindrical rollers of a small diameter which would run the total length of each shaft. The cylinders or rollers would be covered with rubber or rubber-like material. This covering could be fastened to the outer circumference of the rotating members in such a way that the very high rotational speed necessary to meet the landing speed requirements of these fast aeroplanes would cause it to expand under the action of centrifugal force until its cushioning action would be similar to that of a pneumatic tire.

Referring to the drawing:

Fig. 1 shows a plan view of a small section of the runway in detail and shows the general arrangement of its various parts. On the driving shafts 1 are mounted small pneumatic-tired wheels 2 which are connected by belts 3, Fig. 3, to variable-speed, reversible electric motors 4. The shafts 1 are supported by bearings 5, Fig. 4, which are set on top of short column 6. The columns are set in suitable foundations 7. At suitable intervals are placed safety rails 8, Fig. 1. These rails are placed parallel to the center line of the landing strip. Their purpose is to prevent damage to the mechanism in case of bad landings by an aeroplane. They may be set on top of a row of bearings 5, Fig. 4, and at such height that they will prevent the pneumatic tires from being subjected to more than a 75% overload which will prevent damage to the tires in cases of poor landings by aircraft. Fig. 3 shows a side elevation on line A—A of the motors and wheels. The wheels 2 are driven by motors 4 through belts 3 and pulleys 9. The motors are set on suitable foundations 10.

Fig. 5 shows a front elevation of a typical large aeroplane with the bottom of the fuselage 11 in contact with five transverse rows of runway wheels. For clarity in the drawing, no attempt has been made to show the motors or belts in this view or in Fig. 6. In Fig. 5 is also shown the vertical relationship between the top of the tires 2 and the safety rail 8. Fig. 6 shows a side elevation of Fig. 5 and shows the bottom of the fuselage 11 in contact with twelve longitudinal rows of runway wheels. Fig. 7 shows a typical large aircraft at rest on the landing strip. The landing strip wheels 2 are indicated but no attempt is made to show other parts of the runway. In practice, the mechanized landing strip could no doubt be made much narrower than shown in the drawing and should not be elevated above the rest of the flying field more than a few inches. Fig. 7 also shows two rows of photo-electric beam projectors and receivers 12'. These beam projectors should be spaced so that each set of two would control one section of the landing strip as previously described. This arrangement would allow for automatic control.

On the take-off run the automatic electric system will be set so that any desired speed could be achieved. This take-off wheel speed should be somewhat above the speed at which the aircraft will be airborne. For landing purposes the automatic control can set the speed of all wheel sections so that the circumferential speed of the treads of the tires will be slightly less than the landing speed of the aeroplane. After contact is made with the aeroplane, the wheel speed may be so regulated automatically that the aeroplane will be brought to a stop after any desired length of run.

Fig. 8 shows a front elevation of a typical large aeroplane resting on a two-wheeled carriage or truck 12. The truck 12 is shown supported by an elevator 13. Fig. 9 shows a side elevation of Fig. 8 and in addition a side elevation of one end of the landing strip. The purpose of the drawings shown in Fig. 8 and Fig. 9 is to show how the aircraft is transferred from the wheels of the landing strip to the carriages or trucks shown in Fig. 10 and Fig. 11.

When it is desired to remove the aircraft from the landing strip for any reason, it may be moved to the end of the mechanized strip by rotating the wheels until the front end projects over the elevator pit. The elevator being in a lowered position, the truck 12 is placed in position as shown in Fig. 10. The truck is then raised by the elevator to the position shown in Fig. 8 and Fig. 9. When the truck 12 nears the top position, the first part to contact the bottom of the aircraft will be the lower arms of the two L-shaped brackets 14 which are part of the truck assembly. The brackets are held in position by pins or bolts 15 on which thy fit freely in such a way that the ends of the arms may move through a few degrees of an arc of a circle. As the truck moves up, the lower arm of the bracket is forced down in relation to the truck 12. This compresses the spring 16. This action also causes the vertical arms to move inward or toward the sides of the fuselage 11, thus forcing the upper ends of the brackets into recesses 17 which are provided in the sides of the fuselage.

When the front end of the aircraft is lifted clear of the landing strip, it will be clamped firmly by the brackets which cannot be released until the weight of the aeroplane is again sustained by other means. The aeroplane is then moved forward until the recess 18, toward the tail of the aeroplane, is directly over the center of the elevator, the front end now being carried by the truck which is supported by the ground of the air field. The elevator is lowered and the small two-wheeled truck, shown in Fig. 11, is placed on it. The small truck is similar to the larger two-wheeled truck in all its principal features except that the brackets 19 are mounted on a horizontal beam 20 instead of an axle; the wheels 21 are much smaller and are mounted on a vertical column 22 about which they may swivel. The height of the horizontal arms of the brackets 19 of the small truck will be exactly the same height above the floor of the elevator as those of the larger truck when in a similar position. After the smaller truck is in position on the elevator, the elevator is raised until the vertical arms of the brackets 19 are in place in the recesses 18 and the fuselage is lifted clear of the runway wheels. The aeroplane is now supported by the trucks and may be moved anywhere desired on the air field.

The aeroplane need not be removed from the mechanized runway by moving the front end clear first but may just as easily be removed tail first, in which case the small truck will be put in place first and it will be necessary to tow the aircraft rear end first. When necessary to return the aeroplane to the mechanized runway, the above described procedure will be reversed.

When the aircraft is mounted on the wheeled-trucks, it will be entirely feasible to make the take-off run from any runway that is suitable for aeroplanes of comparable size, if desired. The recesses 17 and 18 must be made long enough to allow the springs 16 to force the horizontal arms up sufficiently high to allow the vertical members of the bracket to swing clear of the fuselage. Then when the aeroplane on its take-off run reaches a speed such that it is entirely airborne it will lift clear of the trucks that have supported it thus far on the take-off run. The release will be entirely automatic as the action of the springs 16 will force the arms open as soon as the weight is removed from the trucks. If desirable, automatic brakes may be placed on the wheels of both trucks to bring them to a stop as soon as possible after their release.

It is to be understood that my present invention is in no way concerned with any of the electrical equipment, elevators or construction details. Any suitable apparatus, material or control system may be used insofar as my invention is concerned.

Having described only a typical preferred form and application of my invention, I do not wish to be limited or restricted to the specific details herein set forth, but wish to reserve to myself any variations or modifications that may appear to those skilled in the art or fall within the scope of the following claims.

I claim:

1. A mechanized landing strip comprising rotatably mounted and parallel substantially horizontal shafts, said shafts being arranged at 90° to the center line of the landing strip, resilient tired wheels on said shafts, and spaced safety rails fixedly mounted above said shafts, and extending parallel to the center line of the landing strip, and for the entire length of said landing strip.

2. A mechanized landing strip comprising rotatably mounted and parallel substantially horizontal shafts, said shafts being arranged at 90° to the center line of the landing strip, resilient tired wheels on said shafts, and spaced safety rails fixedly mounted above said shafts, and extending parallel to the center line of the landing strip, and for the entire length of said landing strip, and power drive means extending to each of said shafts.

3. A mechanized landing strip comprising rotatably mounted and parallel substantially horizontal shafts, said shafts being arranged at 90° to the center line of the landing strip, a plurality of spaced resilient tired wheels on each of said shafts, said wheels being in staggered relation to the wheels on the adjacent shafts.

4. A mechanized landing strip comprising rotatably mounted and parallel substantially horizontal shafts, said shafts being arranged at 90° to the center line of the landing strip, a plurality of spaced resilient tired wheels on each of said shafts, said wheels being in staggered relation to the wheels on the adjacent shafts, and power drive means on each of said shafts, and spaced safety rails fixedly mounted above said shafts, and extending parallel to the center line of the landing strip, and for the entire length of said landing strip.

SAMUEL S. KNOX.

REFERENCES CITED

The following references are of record in the file of this patent:

UNITED STATES PATENTS

| Number | Name | Date |
| --- | --- | --- |
| 2,007,910 | Stephens | July 9, 1935 |
| 2,243,538 | Salfisberg | May 27, 1941 |
| 1,720,928 | Stahl | July 16, 1929 |
| 2,331,416 | Muller | Oct. 12, 1943 |
| 2,358,426 | Tompson | Sept. 19, 1944 |
| 2,370,012 | Crespo | Feb. 20, 1945 |

FOREIGN PATENTS

| Number | Country | Date |
| --- | --- | --- |
| 712,060 | France | July 13, 1931 |
| 374,902 | Germany | May 3, 1923 |